Oct. 13, 1959  B. H. SAGE  2,908,733
PROCESS FOR CONDUCTING GASEOUS REACTIONS
Filed Sept. 28, 1954  2 Sheets-Sheet 2
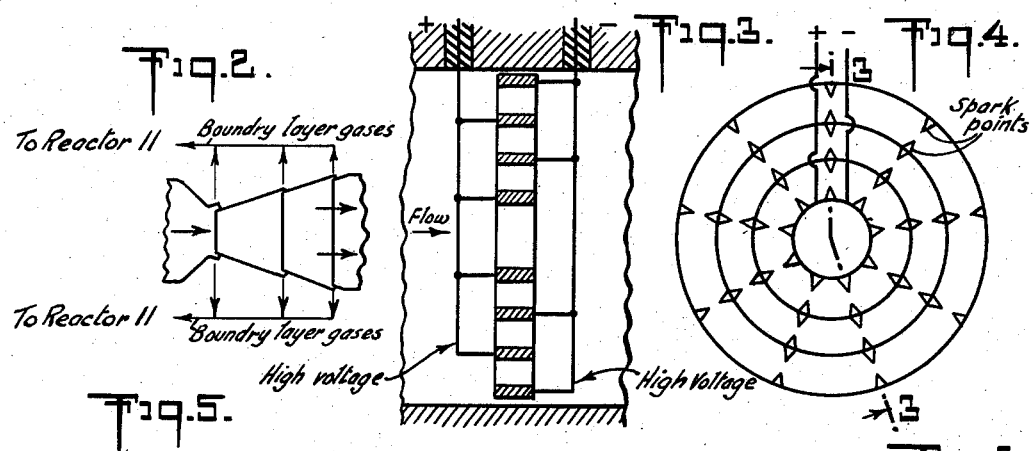
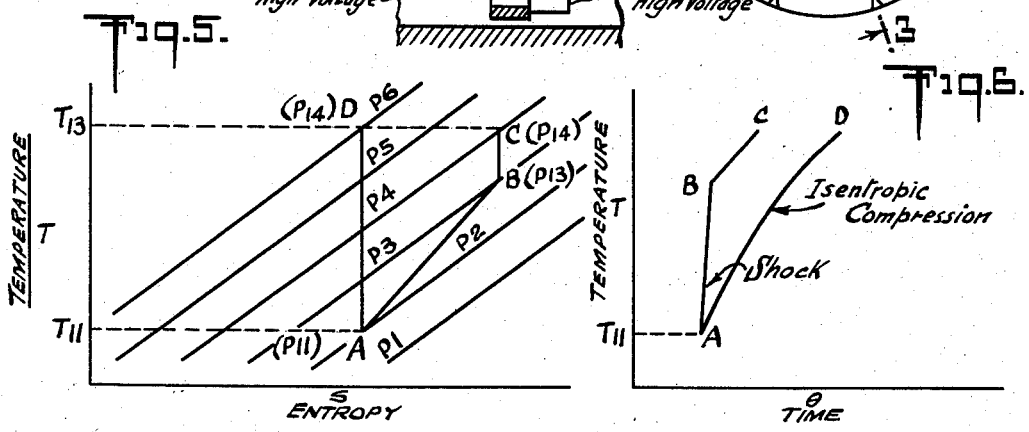
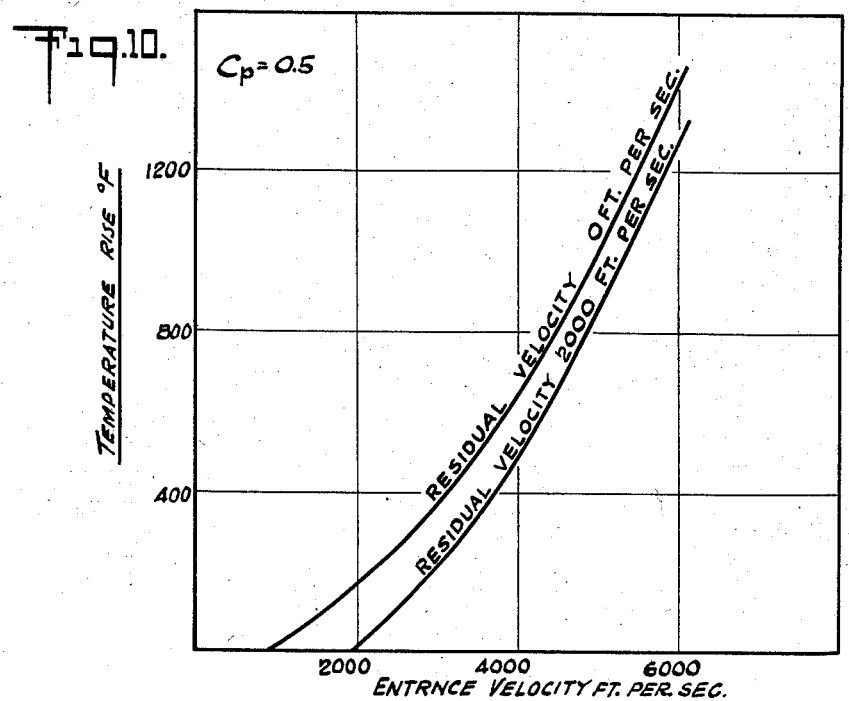

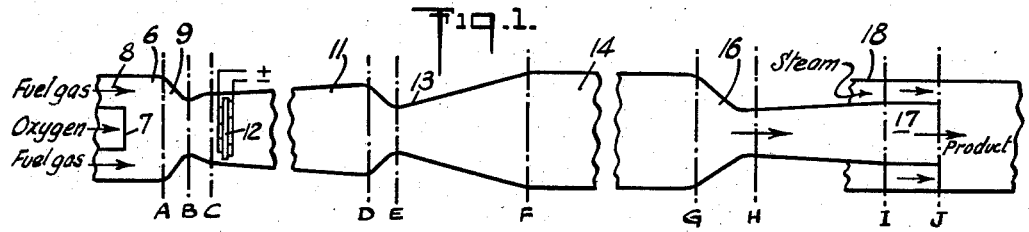
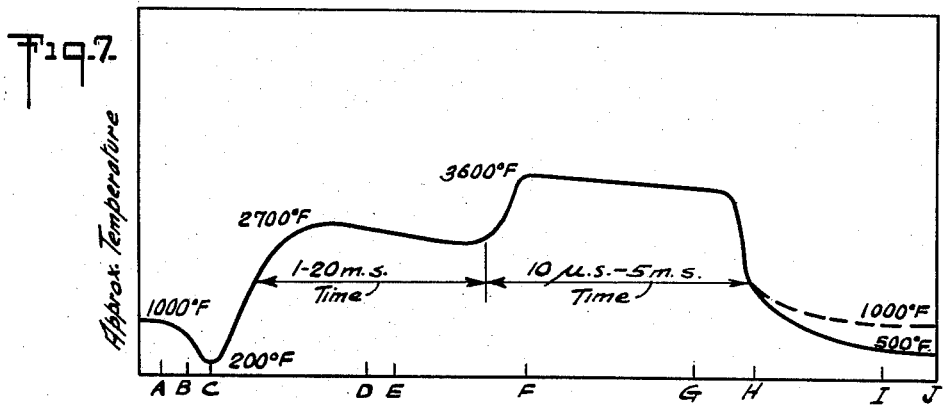
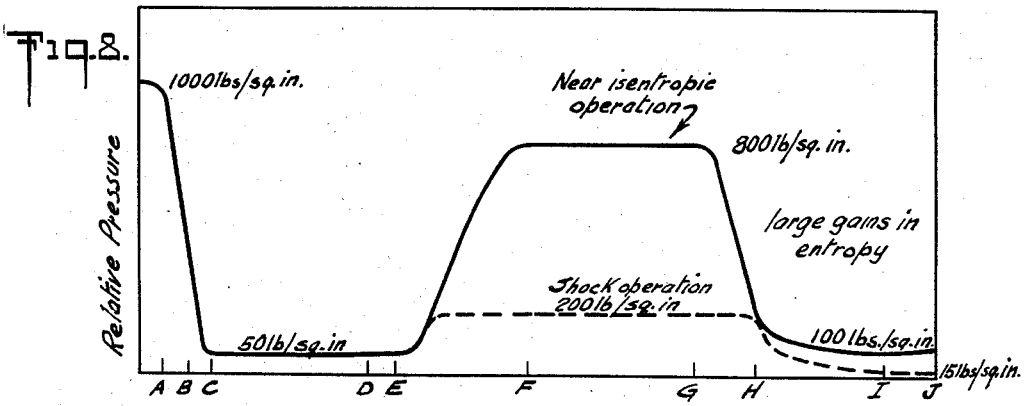
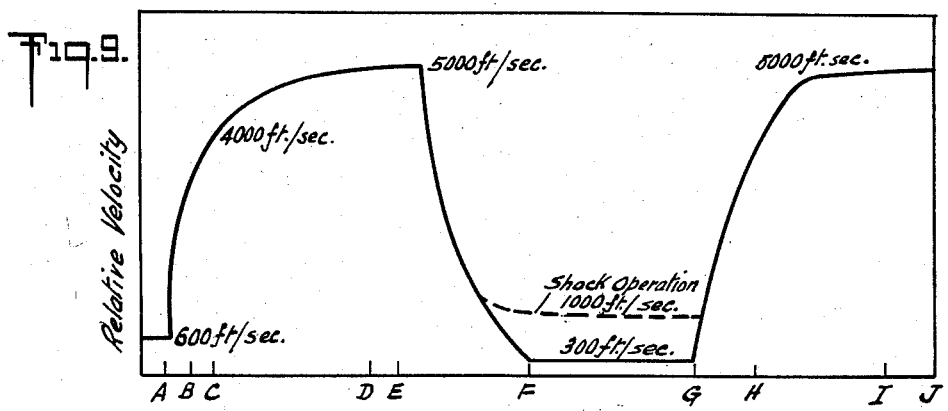

United States Patent Office 2,908,733
Patented Oct. 13, 1959

2,908,733
PROCESS FOR CONDUCTING GASEOUS REACTIONS

Bruce H. Sage, Altadena, Calif., assignor to Texaco Development Corporation, New York, N.Y., a corporation of Delaware Application September 28, 1954, Serial No. 458,916

7 Claims. (Cl. 260—679)

This invention relates to a method of and apparatus for conducting a chemical reaction. The method and apparatus of this invention are particularly useful for conducting controlled reaction between gasiform reactants.

In a number of chemical reactions, for example, the production of acetylene by partial oxidation of a hydrocarbon, it is desirable to subject the reactants to reaction at a high temperature for a short period of time and to immediately quench the reaction products. In the partial oxidation of hydrocarbons with oxygen, practical considerations limit commercial reaction temperatures to a maximum of about 2,800° F. to 3,000° F. It is generally not feasible, for example, to preheat the hydrocarbon to a temperature above the temperature at which the particular hydrocarbon begins to undergo thermal decomposition reactions. Methane, which is the most stable of the hydrocarbons, may be preheated to a temperature on the order of about 1,200° F. Similarly, but because of its reactivity, it is generally not feasible to preheat oxygen to a temperature above about 600° F. These limitations on the permissible preheat temperatures limit the practical reaction temperatures. When methane, for example, preheated to 1,200° F. is reacted with oxygen preheated to 600° F. in the proportions most suitable for production of acetylene or carbon monoxide, the reaction temperature autogenously maintained in an insulated reaction vessel is on the order of 2,600 to 2,800° F.

Although it is possible to increase the reaction temperatures in the carbon-oxygen-hydrogen system by preheating the reactants, the increase in yield of products which may be obtained is often offset by the tendency for the exothermic reactions between carbon monoxide and oxygen not to proceed as far as is the case at lower temperatures.

Such behavior tends to decrease the maximum temperature obtainable and decreases the estimated effects of preheating. Despite the difficulties which have been described, the reaction temperature may be increased by increasing the proportion of oxygen-to-hydrocarbon supplied to the reaction zone. Increasing the reaction temperature in this manner does not serve any useful purpose in this process since the desired products of reaction, such as acetylene or carbon monoxide, for example, are decreased as the relative quantity of oxygen fed to the reactor is increased. However, if the heating is permitted to take place rapidly after initial chemical equilibrium has been obtained, it appears possible to choose selectively the reactions which are influenced and thus increase the yield of the desired products.

By means of the present invention, it is possible to increase the reaction temperature suddenly to a temperature above the normal reaction temperature and to maintain the higher temperature for a controlled period of time. At the higher temperature, further reaction takes place, resulting in products not normally obtainable. The reaction time at the higher temperature is controlled to give optimum concentration of the desired component or components in the reaction products. As a part of this invention, the products of reaction preferably are suddenly quenched by adiabatic, nearly isentropic expansion.

The process of this invention may be operated to selectively favor those reactions which are most rapid. Compounds may be obtained as products which normally are present only as intermediates and which do not ordinarily appear in commercially interesting concentrations in the reaction products. The process of this invention is also of interest to increase yields of desirable products in connection with a number of commercial reactions, e.g., acetylene, mentioned above. By means of the process of this invention, it is possible to obtain as a final product, the product of a fast reaction, which product ordinarily is considered only an intermediate in a sequential set of reactions normally taking place in a kinetic process.

The method and apparatus of the present invention will be more readily understood from a consideration of the following detailed description as related to a specific example.

Fig. 1 of the drawings illustrates diagrammatically in longitudinal cross-section, an arrangement of apparatus which is suitable for carrying out a specific embodiment of my invention. Fig. 2 is a diagrammatic illustration in longitudinal cross-section of a convergent-divergent diffusion nozzle suitable for use in the system of Fig. 1. Figs. 3 and 4 illustrate diagrammatically a sparking flame holder suitable for use in the system of Fig. 1. Fig. 5 is a diagram illustrating qualitatively, for the sake of comparison, the changes in temperature and entropy in shock and non-shock diffusers. Fig. 6 is a diagram illustrating comparatively the time-temperature relationships in shock and non-shock (isentropic compression) diffusers. Figs. 7, 8, and 9 illustrate, respectively, qualitative changes in temperature, pressure and velocity of the gases at various designated portions of the system of Fig. 1. Fig. 10 is a diagram illustrating temperature rise as a result of changes in velocity for a gas having a $C_p$ (specific heat at constant pressure) of 0.5.

With reference to Fig. 1 of the drawings, reactants, for example, oxygen and methane, are introduced into the system as coaxial streams in highly turbulent flow and mixed with one another in the mixing zone 6 while flowing at 600 ft. per sec. (Fig. 9). As illustrated in the drawing, oxygen is introduced through the axial tubular conduit 7, while a hydrocarbon, for example, methane, is introduced through the annular passageway 8 coaxial with the oxygen conduit. The mixture at 1000° F. and 1000 lb. per sq. in. (Figs. 7 and 8) is passed through the convergent-divergent nozzle 9 having a convergent section A–B and a divergent section B–C into the reaction chamber 11 through which it flows at a relatively high velocity in excess of that velocity at which flame propagation may be maintained. The gas is expanded in passing through nozzle 9 from 1000 lbs. per sq. in. to 50 lbs. per sq. in., resulting in an acceleration in velocity to 4000 ft. per sec. and a drop in temperature at 200° F. (Figs. 7 and 8). A series of widely dispersed sparks or arcs, through which the high velocity gas is permitted to pass, serve as active flame holders. A suitable spark-producing flame holder device is illustrated in Figs. 3 and 4. The quantity of energy added electrically at this point (through spark devices 12) is small and does not influence materially the internal energy of the system. The prime purpose is to establish the reaction between the oxygen and methane which have been employed as an example for this operation.

The flow at this point is supersonic and the flame holders used for the electrical ignition by means of sparks or arcs introduce sufficient supplementary turbulence so as to induce the rapid spread of the reaction throughout the entire reaction chamber 11. The reaction in reaction chamber 11 raises the temperature to about 2700° F. and the velocity to about 5000 ft. per sec. (Figs. 7 and 9). It is desirable to maintain sufficiently high velocities in chamber 11 so that the kinetic energy of the gross stream is a significant part of the total energy of the system. Velocities in the range of from 1000 to 5000 feet per second are advantageous, depending upon the extent to which the temperature is to be raised later by means of a diffuser. To eliminate build-up of boundary layer along the walls of the reaction chamber 11 the length of the reaction chamber is preferably no greater than is necessary to carry out the desired chemical reaction. The reactor length and gas velocity are correlated to give a reaction time or residence time in reaction chamber 11 of 1 to 20 milliseconds (Fig. 7). The build-up of boundary layer along the walls of the reaction chamber 11 is undesirable as it tends to slow down a fraction of the high velocity gas as a result of the friction effect.

The products of reaction from zone 11 pass through the converging-diverging diffuser 13 (having a convergent section D–E and a divergent section E–F) into a secondary reaction chamber 14. In passing through diffuser 13, the velocity of the stream drops to a velocity of 300 or 1000 ft. per sec. (Fig. 9) with an accompanying increase in pressure to a pressure of 200 or 800 lbs. per sq. in. (Fig. 8), depending upon whether the diffuser is operated under shock or near-isentropic conditions, and the temperature increases to about 3600° F. (Fig. 7).

Nozzle 13 may be a supersonic diffusion nozzle of the shock type or may be designed to operate as a diffuser without accompanying shock waves in the convergent section. Fig. 1 illustrates diagrammatically a shock type nozzle 13, whereas Fig. 2 illustrates diagrammatically a diffuser, with means for removing the boundary layer, which may be substituted for the shock type nozzle. A diffuser has a maximum angle of approach of about 15° and a maximum angle of convergence of about 15°. Higher angles result in setting up a shock wave.

Regardless of type, nozzle 13 causes an increase in temperature and pressure of the gas. The magnitude of the temperature increase is established, within small limits, from the kinetic energy of the stream in reactor 11 as indicated in the following expression:

$$T_s - T = \frac{u^2}{2gC_p}$$

wherein:

T is the actual temperature of the moving gas stream, $T_s$ is the temperature of the gas when the stream is instantaneously stopped whereby its kinetic energy is converted to heat, u is the velocity of the gas stream, g is the gravitation constant (acceleration of a free falling body due to gravity), and $C_p$ is the specific heat of the gas at constant pressure.

Fig. 10 illustrates the temperature rise as a result of changes in velocity for a gas having a $C_p$ of 0.5.

If a small change in pressure is desired, a shock diffuser which will follow qualitatively the path ABC of Fig. 5 may be employed. This type of diffuser will operate over a rather wide range of conditions and may easily be placed in operation. In the shock front shown from A to B in Fig. 5, the pressure is raised as predicted by the conservation of momentum, but there is a marked increase in entropy as illustrated in this figure. The fluid then follows a more nearly isentropic path from B to C.

In the case of a converging-diverging diffuser of the type shown in Fig. 1, a more nearly isentropic path is followed from A to B in Fig. 5. This type of diffuser will not operate over as wide a range of conditions but does yield a larger change in pressure for a given change in temperature. A comparison of the time-temperature relationships in the shock diffuser and in the converging-diverging diffuser is presented qualitatively in Fig. 6. It is apparent that there is a rapid increase in temperature across the shock front from A to B followed by a more gradual change in temperature from B to C. In the case of the converging-diverging diffuser the initial part of the process results in a somewhat less rapid increase in temperature with time.

If the more gradual increases in temperature along the path from A to C are acceptable, the converging-diverging nozzle is to be preferred and its range of usefulness may be increased by the use of a series of annular overlapping ports such as are shown in Fig. 2. These ports remove the boundary layer at the walls of the diffuser and decrease the tendency for "stalling." The gas leaving the boundary layer of the diffuser through these ports is returned to the system at the flame holder 12.

A shock diffuser permits a rapid rise in temperature with an accompanying increase in entropy. By a somewhat more gradual increase in pressure and temperature along a more nearly isentropic path, such a diffuser may be used where high temperature increments are desired, such as would be encountered with high supersonic velocities in the reaction zone 11. If shock phenomena are employed, there is a smaller rise in pressure than is found for a more nearly isentropic process which may be approached in a converging-diverging diffuser with appropriate boundary layer control. The rate of temperature rise may be as high as $10^{8°}$ R. per second, thus permitting marked divergences from chemical equilibrium to be realized.

The products of reaction from chamber 14 are discharged through a convergent-divergent nozzle 16 (having a convergent section G–H and a divergent section H–I) which increases the velocity of the gas stream to a supersonic velocity.

Nozzle 16 is suitably one of the types employed in jet propulsion used in ordinance equipment. As indicated earlier, expansion of the gas nozzle 16 results in a rapid decrease in temperature, thus decreasing the rate of reaction to a negligible value. The convergent-divergent quenching nozzle 16 of Fig. 1 may reach rates of cooling of the order of $10^{8°}$ R. per second. The magnitude of these cooling rates may be predicted easily for a particular geometric arrangement of the nozzle. The exit velocities are preferably in the range of from 3000 to 6000 feet per second. In the specific example, the exit velocity is 5000 ft. per sec. (Fig. 9) with the exit pressure of 15 or 100 lbs. per sq. in. and temperature of 500 or 1000° F., depending upon whether nozzle 13 is operated under shock or near-isentropic conditions. The resulting high velocity jet is discharged through conduit 17.

The period of local high temperature after the exit from the diffuser 13 is carefully controlled in order to permit only those reactions which are desired to proceed. For example, it appears quite possible to avoid the disintegration of carbon dioxide. By comparison, many reactions are quite rapid and thus will be carried almost to an equilibrium equivalent to the state at the exit of the diffuser 13. In some instances the selection of a proper interval of time to the exit of the diffuser may necessitate the elimination of the convergent portion (section D–E) of the diffuser 13 and the utilization primarily of a shock diffuser. In this instance, only short times are required for the first part of the diffusion process and the convergent-divergent nozzle 16 is placed immediately adjacent the shock diffuser 13. As illustrated in Fig. 7, the secondary reaction chamber 14 is designed to provide a reaction time or residence time within the range of 10 microseconds to 5 milliseconds.

In order to avoid reheating the rapidly moving jet gas by contact with a solid surface, the jet stream is mixed with a cool gas, e.g., steam, moving at a comparable velocity. This may be accomplished satisfactorily by a series of annular nozzles intermingling alternate thin streams of steam and product gas. This is indicated diagrammatically in Fig. 1 with steam discharged from passageway 18 annularly of the stream of product gas from conduit 17. The quenched products of reaction and the cooling gas are mixed by turbulent diffusion with no large exchanges of momentum. The average energy of the resulting mixed streams is sufficiently low so that the gas may be cooled by conventional heat interchangers if desired. In such instances, approximately five parts of cooling gas per part of reacting gas should be employed. Under such circumstances the mixed gas does not yield sufficiently high boundary layer temperatures to cause any significant loss of desirable products. Recovery factors varying from 0.7 to 0.9 are generally experienced in this area. The adiabatic boundary layer temperatures of conventional cooling equipment may be maintained below about 1000° F.

The mixed gases, particularly if the cooling gas is traveling at a velocity comparable to that of product gases, may be used as a source of power in conventional impulse turbine equipment. It is desirable to employ at least one impulse stage in the turbine and to avoid pressure stages until the velocity has been decreased materially. In some instances, it may be desirable to employ a counter-rotating impulse-type turbine. The use of the mixed gas avoids high impact temperatures upon the turbine blades. With proper design, no difficulties from overheating of the turbine parts results.

In operation, the reactants are preferably preheated to the highest practical temperatures before they are charged through conduits 7 and 8. In some instances, it may be practical to first mix the reactants and then to preheat the reactant mixture. The preheated reactants, flowing at a velocity in the range of 1000 to 5000 feet per second, are subjected to reaction in reaction zone 11. The reaction between a hydrocarbon and free oxygen, for example, is an exothermic reaction which increases the temperature well above the temperature of the entering gas streams. The average temperature of the gases at various points within the illustrative system of Fig. 1 is illustrated by way of example in Fig. 7. The letters A to J along the abscissa represent corresponding points in the system of Fig. 1. Similarly, Fig. 8 illustrates, by way of example, variations in average pressure at various points in the system, while Fig. 9 illustrates variations in average velocity.

The temperature increase, due to reaction in reactor 11, results in a volume expansion. With many reactions, e.g., partial oxidation of hydrocarbons, there is also a considerable increase in volume due to the reaction mechanism. For example, in the following reaction:

$$CH_4 + \tfrac{1}{2}O_2 \rightarrow CO + 2H_2$$

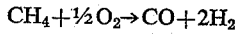

the volume of product is twice the volume of the reactants.

As illustrated in Fig. 9, the temperature and volume increase in the reactor (between points C and D) results in an appreciable increase in velocity of the gases even in a reactor of uniform cross-sectional area. It will be understood that the cross-sectional area of the reactor 11 may be uniform or may increase or decrease in the direction of flow of the gases. It is possible, for example, to design the reactor so that the velocity from point C to point D remains essentially constant.

Following the preliminary reaction, which takes place in reaction chamber 11, while the gases are flowing at high velocity, the gas velocity is reduced by the diffuser nozzle 13, so that the temperature in the secondary reactor 14 is increased to a temperature well above that in reaction chamber 11. Reduction of velocity of the gas stream by the diffuser 13 converts the kinetic energy of the stream to internal energy, raising the temperature of the gas. As a result, the temperature in the secondary reaction zone 14 is higher than the temperature in reactor 11. The increase in temperature which may be obtained in this manner may be as much as several hundred degrees Fahrenheit, e.g., within the range of 100 to 600° F.

The reaction products discharged from reactor 14 may be quenched by conventional methods, e.g., by contacting the gases with a water spray. In the system of this invention, it is generally advantageous to quench the reaction by sudden expansion of the reaction products. This may be accomplished in a most effective manner by passing the gases through a convergent-divergent nozzle which suddenly reduces the temperature and pressure of the gas stream, imparting a high velocity, preferably a supersonic velocity, to the gas stream.

The jet stream issuing from nozzle 16 is a potential source of power. By introducing the gases into a suitable engine, e.g., a turbine, it is possible to recover energy from the gas stream in the form of power. It will be appreciated that sudden reduction of the velocity of the stream issuing from nozzle 16, as by impingement on turbine blades, will result in a sudden increase in temperature at the point of impingement. In some instances, this sudden temperature increase may adversely affect the product or overheat the turbine blades. It is generally desirable to cool the gases still further prior to introducing them into a turbine, for example. This may be accomplished by infusion of gas or a vaporizable liquid into the jet stream. As illustrated in Fig. 1, a cooling gas is introduced through passageway 18 annularly of the jet. The cooling gas may comprise cooled products of reaction, recycled into the jet stream.

Obviously, many modifications and variations of the invention, as hereinbefore set forth, may be made without departing from the spirit and scope thereof, and therefore only such limitations should be imposed as are indicated in the appended claims.

I claim:

1. In a process for conducting a chemical reaction wherein a gasiform reactant is converted to a gasiform reaction product and wherein said reaction product yield is favorably affected by elevated temperature, the improvement which comprises passing a gasiform reactant as a continuous stream into a primary reaction zone at a velocity above about 1000 feet per second, imparting thermal energy to said gasiform reactant in said primary reaction zone by exothermic reaction of said reactant thereby raising said reactant to an elevated temperature while maintaining the velocity therein above about 1000 feet per second effecting conversion of at least a portion of said reactant to a gasiform reaction product the yield of which is favored by high temperature, and subjecting the resulting stream comprising gasiform reaction product to deceleration along a path of flow of continuously increasing cross-sectional area into a second reaction zone of greater cross-sectional area than said first reaction zone under substantially adiabatic conditions such that kinetic energy of said stream is converted to internal energy thereby increasing the temperature and pressure of said stream to a temperature and pressure in excess of that in said first reaction zone producing an increased yield of said reaction product.

2. A process for converting a hydrocarbon into a gaseous reaction product the formation of which is favored by high temperature which comprises introducing gasiform reactants comprising said hydrocarbon into a reaction zone forming a fluid stream, subjecting said reactants in said fluid stream to exothermic reaction at an elevated temperature and a velocity in the range of 1000 to 5000 feet per second forming a stream of reaction fluid comprising products of said reaction having a gas velocity within said range, and subjecting said reaction fluid to a sudden increase in temperature and pressure by deceleration of said stream in a diffusion zone converting kinetic energy of said stream to internal energy and effecting a change in composition of said reaction fluid, and quenching the resulting products of reaction.

3. A process as defined in claim 2 wherein said reaction fluid is subjected to rapid deceleration under non-shock conditions along a path of flow of increasing cross-sectional area having an angle of divergence not greater than 15°.

4. A process as defined in claim 1 wherein the velocity in said first reaction zone is supersonic and the velocity in said second reaction zone is subsonic.

5. A process as defined in claim 3 wherein the residence time of said reaction fluid in said first reaction zone is within the range of 1 to 20 milliseconds and the reaction time within said second reaction zone is within the range of 10 microseconds to 5 milliseconds.

6. A method as defined in claim 1 wherein the gaseous product from said second reaction zone is quenched by subjecting said product to rapid expansion.

7. A process as defined in claim 1 wherein products of reaction from said second reaction zone are quench cooled.

References Cited in the file of this patent

UNITED STATES PATENTS

| | | |
|---|---|---|
| 2,377,847 | Allen et al. | June 12, 1945 |
| 2,475,093 | Hasche | July 5, 1949 |
| 2,520,149 | Keeling | Aug. 29, 1950 |
| 2,572,664 | Robinson | Oct. 23, 1951 |
| 2,660,032 | Rosenthal | Nov. 24, 1953 |
| 2,727,932 | Evans et al. | Dec. 20, 1955 |
| 2,805,268 | Cunningham | Sept. 3, 1957 |
| 2,868,856 | Hale et al. | Jan. 13, 1959 |

FOREIGN PATENTS

| | | |
|---|---|---|
| 709,035 | Great Britain | May 12, 1954 |